(12) United States Patent
Tada et al.

(10) Patent No.: US 8,076,631 B2
(45) Date of Patent: Dec. 13, 2011

(54) PHOTODETECTOR CIRCUIT

(75) Inventors: Masahiro Tada, Tokyo (JP); Takashi Nakamura, Saitama (JP); Hirotaka Hayashi, Fukaya (JP); Masayoshi Fuchi, Ageo (JP); Takayuki Imai, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 223 days.

(21) Appl. No.: 12/257,749

(22) Filed: Oct. 24, 2008

(65) Prior Publication Data

US 2009/0108179 A1    Apr. 30, 2009

(30) Foreign Application Priority Data

Oct. 29, 2007   (JP) .................................. 2007-280616

(51) Int. Cl.
  *H01J 40/14*         (2006.01)

(52) U.S. Cl. ...................... 250/226; 250/208.1; 348/307; 348/308

(58) Field of Classification Search .................. 250/226, 250/208.1; 348/307, 308
See application file for complete search history.

(56) References Cited

U.S. PATENT DOCUMENTS

| | | | |
|---|---|---|---|
| 2007/0046619 A1 | 3/2007 | Sano et al. | |
| 2008/0073490 A1* | 3/2008 | Koide | 250/214 C |
| 2008/0173794 A1* | 7/2008 | Oike et al. | 250/208.1 |

FOREIGN PATENT DOCUMENTS

| | | | |
|---|---|---|---|
| JP | 2004312497 A | * | 11/2004 |
| JP | 2007-65004 | | 3/2007 |
| JP | 2007-114315 | | 5/2007 |
| KR | 10-2007-0026188 | | 3/2007 |

OTHER PUBLICATIONS

Korean Office Action mailed Aug. 9, 2010 in corresponding Korean patent application No. 10-2008-0105819.
Korean Office Action mailed Mar. 29, 2010 in Korean patent application No. 10-2008-0105819.

* cited by examiner

*Primary Examiner* — Tony Ko
(74) *Attorney, Agent, or Firm* — Finnegan, Henderson, Farabow, Garrett & Dunner, L.L.P.

(57) ABSTRACT

Two unshielded photosensors to determine the outside-light illuminance and two shielded photosensors are placed alternating both in the longitudinal direction and in the lateral direction. Then, the difference between the output of the unshielded photosensors and the output of the shielded photosensors is obtained. Accordingly, even when the thermoelectric currents differ from each other due to a variation in characteristics between the elements and a difference in the thermal distribution between the elements, the sensor currents can be corrected, so that a photodetector circuit which stably determines the outside-light illuminance can be provided.

2 Claims, 3 Drawing Sheets

PHOTODETECTOR CIRCUIT

CROSS-REFERENCE TO RELATED APPLICATIONS

This application is based upon and claims the benefit of priority from Japanese Patent Application No. 2007-280616 filed on Oct. 29, 2007; the entire contents of which are incorporated herein by reference.

BACKGROUND OF THE INVENTION

1. Field of the Invention

The present invention relates to a photodetector circuit that determines illuminance by taking a thermoelectric current into account.

2. Description of the Related Art

Liquid crystal display devices, which are light in weight, thin in shape, and low in power consumption, are frequently used as the display devices for information devices and for mobile terminal devices. To achieve a brighter display screen, many liquid crystal display devices are provided with backlights for emitting light from the back side of the liquid crystal panel. The necessary illuminance of the backlight for sufficient visibility differs depending on the brightness of a place where the liquid crystal display device is used. To detect the difference, some display devices have photosensors to determine the illuminance of the outside light to adjust the illuminance of the backlight. A known example of such display devices is disclosed in Japanese Patent Application Publication No. 2007-114315.

Integration of the photosensor into the liquid crystal panel is advantageous for the downsizing of a liquid crystal display device. However, the photosensor that is formed integrally with the liquid crystal panel by the low-temperature polysilicon technique has its own drawbacks. For example, the photosensor thus formed is likely to be affected by the thermoelectric current, which in turn makes it difficult to accurately determine the outside-light illuminance. To address this problem, the display device disclosed in the above-mentioned document is provided not only with a first photosensor to receive the outside light and to determine the illuminance thereof but also a second photosensor to determine the thermoelectric current while being shielded from the outside light. Calculating the difference between the two values thus determined gives a more accurate illuminance of the outside light.

However, in some cases, the first photosensor and the second photosensor have different levels of thermoelectric currents due to a variation in characteristics between the two photosensor elements and a difference in the temperature distribution between the positions where the two photosensors are respectively arranged. This causes a problem that a stable photodetector circuit cannot be provided.

SUMMARY OF INVENTION

An object of the present invention is providing a photodetector circuit that achieves stable measurement of illuminance even when the device characteristics of the photosensor elements vary from one element to another.

A photodetector circuit according to the present invention includes; first photosensor and a second photosensor both connected in parallel to each other, and configured to receive the outside light; third photosensor and a fourth photosensor both provided with respective light shields that are configured to block the outside light, and being connected in parallel to each other; a differential circuit that is configured to obtain the difference between the sum of the outputs of the first and the second photosensors and the sum of the outputs of the third and the fourth photosensors. In the photodetector circuit, the third photosensor is placed side by side with the first photosensor in the lateral direction, and the fourth photosensor is placed side by side with the first photosensor in the longitudinal direction. In addition, the second photosensor is placed side by side with the third photosensor in the longitudinal direction and, at the same time, with the fourth photosensor in the lateral direction.

In addition, in the photodetector circuit according to the present invention, the first and the second photosensors receiving the outside light and the third and the fourth photosensors shielded from the outside light are placed alternating both in the longitudinal and the lateral directions. Accordingly, the differences in characteristics between the elements and the difference in thermoelectric current between the elements caused by the temperature distribution can be corrected. Thus, the outside-light illuminance can be determined with the correction being taken into account. As a consequence, the outside-light illuminance can be determined stably.

DESCRIPTION OF THE EMBODIMENT

An embodiment of the present invention will be described below with reference to the drawings.

Figure 1:
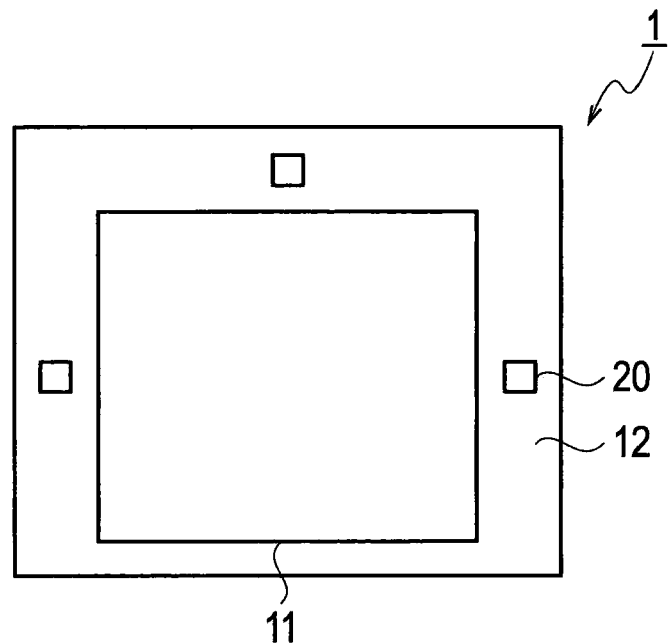
FIG. 1 is a plan view showing the configuration of a display device provided with a photodetector circuit according to an embodiment of the present invention.

As shown in FIG. 1, a display device 1 includes a display area 11 and a surrounding area 12 that surrounds the display area 11. The surrounding area 12 is provided with a light-shielding layer to prevent the light that the backlight emits from leaking. Openings are formed in the light-shielding layer. Photodetectors 20 are disposed at the positions corresponding to the openings. The outside light enters the photodetectors 20 through the openings. The display device 1 adjusts the illuminance of the backlight in accordance with the outside-light illuminance determined by the photodetectors 20. In this respect, all the values of outside-light illuminance determined by the respective photodetectors 20 may be used for the purpose. Alternatively, only one of all the values thus determined may be selected and used for the same purpose.

Figure 2:
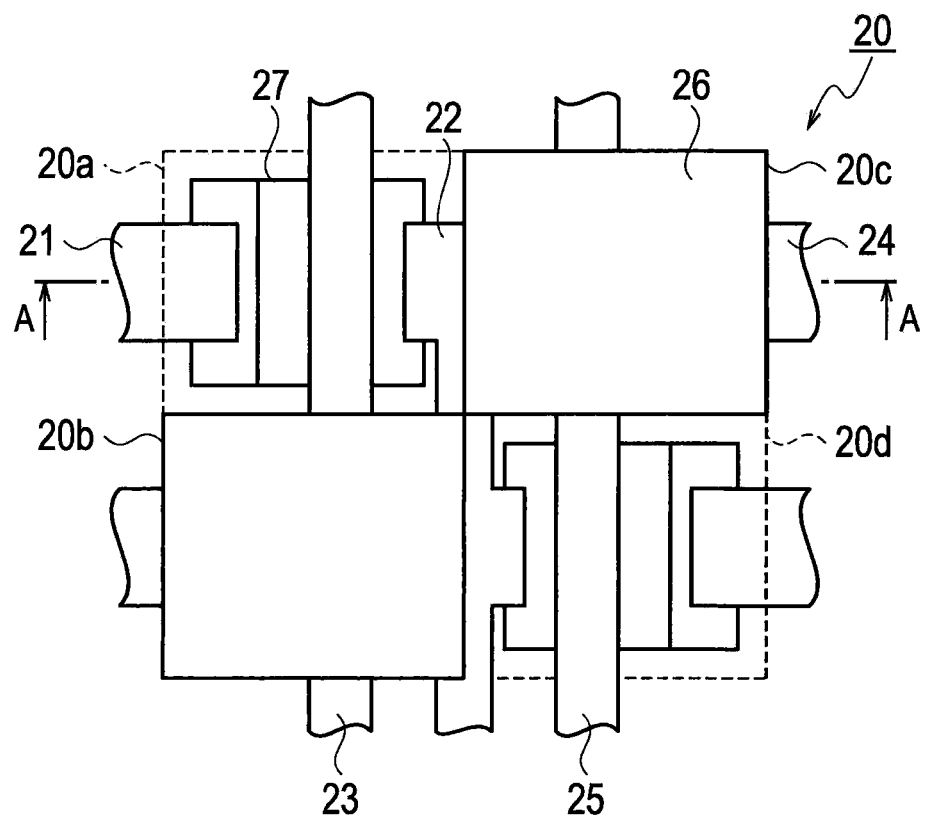
FIG. 2 is a plan view showing the placement of photosensors that the photodetector circuit of the embodiment has.

Next, a photodetector circuit according to this embodiment will be described. FIG. 2 shows that each of the photodetectors 20 includes four photosensors 20a, 20b, 20c and 20d placed so as to be adjacent to one another. Two of these four photosensors—specifically, the photosensors 20b and 20c— are provided with photo-shielding layers 26 to block the outside light. The shielded photosensor 20c is placed side by side with the unshielded photosensor 20a in the lateral direction, while the shielded photosensor 20b is placed side by side with the photosensor 20a in the longitudinal direction. The unshielded photosensor 20d is placed side by side with the shielded photosensor 20c in the longitudinal direction and with the shielded photosensor 20b in the lateral direction. To put it other way, the unshielded photosensors 20a and 20d and the shielded photosensors 20b and 20c are arranged, on the substrate plane, alternately both in the lateral and the longitudinal directions to form a checkerboard pattern.

A thermoelectric current and photoelectric current that is proportional to the outside-light illuminance flow through the unshielded photosensors 20a and 20d. On the other hand, the thermoelectric current alone flows through the shielded photosensors 20b and 20c. Accordingly, the current sensed by the unshielded photosensors 20a and 20d can be corrected by using the thermoelectric current determined by the shielded photosensors 20b and 20c. Then, the outside-light illuminance is obtained by the photoelectric current obtained through the correction.

Figure 3:
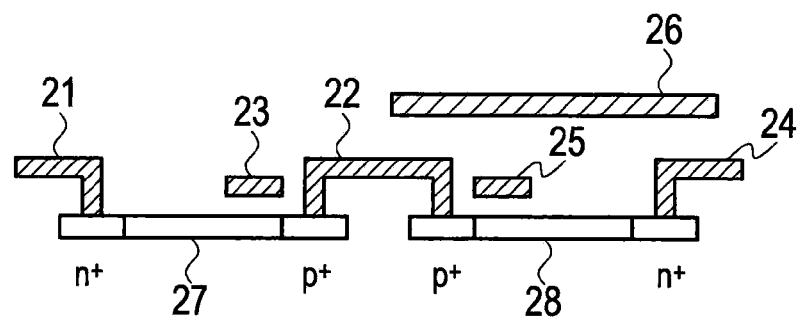
FIG. 3 is a schematic diagram illustrating the configuration shown in the section taken along the line A-A in FIG. 2. A substrate, an undercoat layer, and an insulating layer are omitted, and only a metal layer and a semiconductor layer are illustrated in FIG. 3.

A gate-control type thin-film diode with a PIN structure is used for each of the photosensors 20a, 20b, 20c, and 20d. As shown in FIG. 3, in the photosensor 20a, a polycrystalline semiconductor layer 27 is formed on top of an undercoat layer (not shown) that is formed on top of a substrate (not shown). A p+ region, an i (intrinsic) region, and an n+ region are formed in the polycrystalline semiconductor layer 27. A gate electrode 23 is formed over the i region with an insulating layer (not shown) interposed in between. The p+ region is connected to an anode electrode 22 via a contact hole. The n+ region is connected to a cathode electrode 21 via a contact hole. The photosensor 20d has a similar configuration.

Likewise, the shielded photosensor 20c includes a polycrystalline semiconductor layer 28 and a gate electrode 25. An anode electrode 22 is connected to the p+ region while a cathode electrode 24 is connected to the n+ region. The photosensor 20c is provided with a light-shielding layer 26 to block the outside light, above the polycrystalline semiconductor layer 28. The light-shielding layer 26 may be a light-shielding metal layer formed over the PIN diode. Alternatively, the light-shielding layer 26 may be a black-matrix layer formed over an opposing substrate placed so as to face the substrate on which the photosensor 20c is formed. The photosensor 20b has a similar configuration.

When the outside-light illuminance is determined with a conventional set of one shielded photosensor and one unshielded photosensor, and correct the thermoelectric current as in the case of the above-mentioned example, the values of the thermoelectric current related to the respective photosensors may sometimes differ from each other. This is because for such reason as the differences in device characteristics between the photosensor elements. As a consequence, the photodetector circuit thus configured cannot perform stable photodetection. The characteristics differences between the elements of a device frequently occur between each lines or rows. To address the difference, the unshielded photosensors 20a and 20d and the shielded photosensors 20b and 20c are alternately arranged both in the longitudinal and the lateral directions. As a consequence, the difference between elements is absorbed, so that a stable photodetector circuit is formed. In addition, when a heat source is located near the photosensors and causes a difference in the thermal distribution between lines of, or rows of elements, the differences in thermoelectric current can be absorbed.

The sensor current defined as the value of current flow of each of the photosensors—the unshielded photosensors 20a and 20d and the shielded photosensors 20b and 20c—are expressed by the following equalities:

sensor current A=thermoelectric current A+photoelectric current A;
sensor current B=thermoelectric current B;
sensor current C=thermoelectric current C; and
sensor current D=thermoelectric current D+photoelectric current D.

Suppose a case where the characteristics of elements differ between each lines or each rows, and thus the flows of thermoelectric current differ between photosensors that are adjacent to each other in the lateral, or the longitudinal direction. Even in this case, since the unshielded photosensors 20a and 20d and the shielded photosensors 20b and 20c are placed alternating one another both in the lateral and the longitudinal directions, the equality thermoelectric current A+thermoelectric current D−(thermoelectric current B+thermoelectric current C)=0 holds true. Accordingly, stable calculation of the sum of the photoelectric current A and the photoelectric current D is made possible by subtracting the sum of the sensor current B and the sensor current C from the sum of the sensor current A and the sensor current D.

Figure 4:
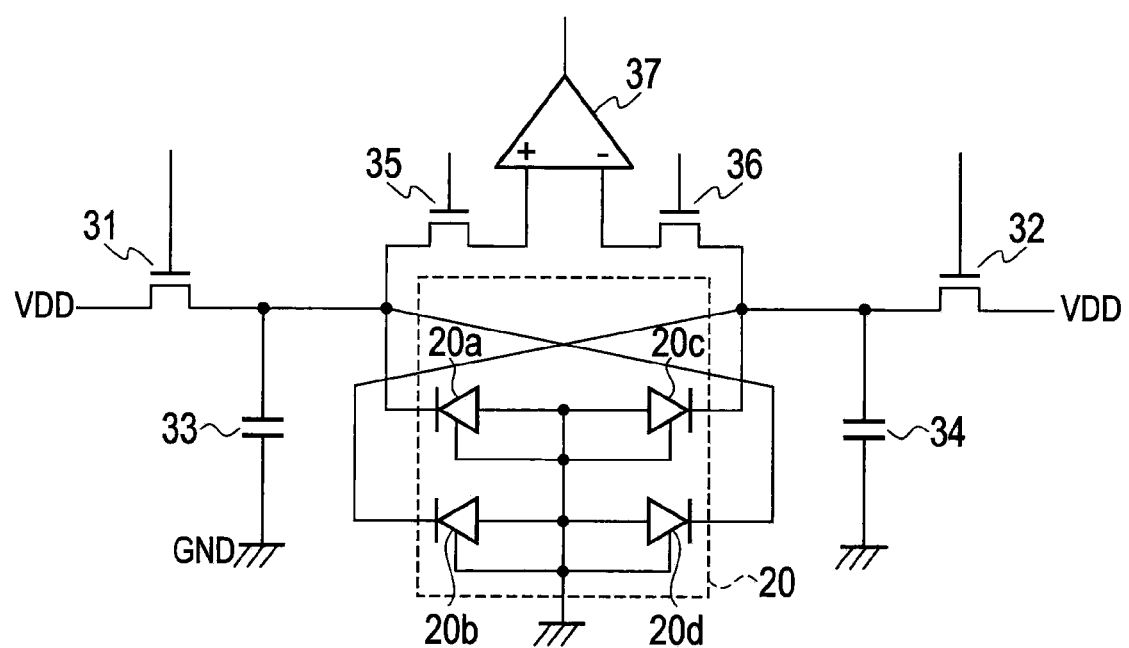
FIG. 4 is a circuit diagram showing the circuit configuration of the photodetector circuit.

Next, an operation of the photodetector circuit according to this embodiment will be described. The photodetector circuit shown in FIG. 4 includes: the photodetector 20 having the unshielded photosensors 20a and 20d that are connected in parallel to each other as well as the shielded photosensors 20b and 20c that are connected in parallel to each other; a capacitor element 33 connected in parallel to the unshielded photosensors 20a and 20d; a capacitor element 34 connected in parallel to the shielded photosensors 20b and 20c; a switching element 31 that controls the timing to charge the capacitor element 33; a switching element 32 that controls the timing to charge the capacitor element 34; a switching element 35 that outputs the electric potential of the capacitor element 33; a switching element 36 that outputs the electric potential of the capacitor element 34; a differential amplifier 37 that obtains the difference in the electric potential between the capacitor elements 33 and 34.

Firstly, the switching elements 31 and 32 are turned on. Thus, a predetermined voltage VDD is pre-charged in the capacitor elements 33 and 34. Subsequently, the switching elements 31 and 32 are turned off. Thus, the sensor current A flows through the photosensor 20a, the sensor current A including the photoelectric current A and the thermoelectric current A while sensor current D flows through the photosensor 20d, the sensor current D including the photoelectric current D and the thermoelectric current D. As a consequence, the electric potential of the capacitor element 33 is lowered. Meanwhile, the electric potential of the capacitor element 34 is also lowered because the thermoelectric current B flows through the photosensor 20b, and because the thermoelectric current C flows through the photosensor 20c. After that, the switching elements 35 and 36 are turned on to input the values of the electric potential for the capacitor elements 33 and 34 into the differential amplifier 37 to obtain the difference between the two values for the respective capacitor elements 33 and 34. In this way, the thermoelectric current B and the thermoelectric current C are cancelled out from the sensor current A and from the sensor current D. Accordingly, more accurate determination of the photoelectric currents A and D that are proportional to the outside-light illuminance can be achieved. As a consequence, the determination of the outside-light illuminance can be achieved while the influences of the thermoelectric current are reduced.

The output of the photodetector circuit is amplified with an amplifier, and the resultant signal is converted into a digital signal with an A/D converter circuit. The signal thus converted is then used for adjusting the illuminance of the backlight.

Figure 5:
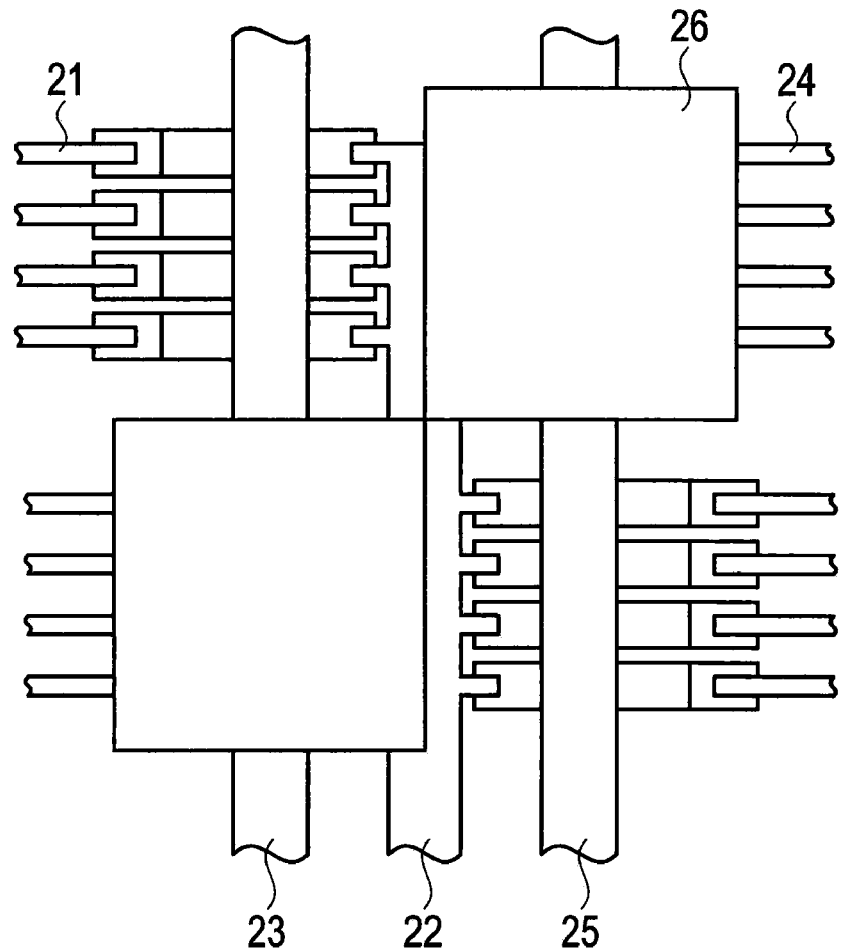
FIG. 5 is a plan view showing the placement of photosensors that another photodetector circuit of the embodiment has.
Figure 6:
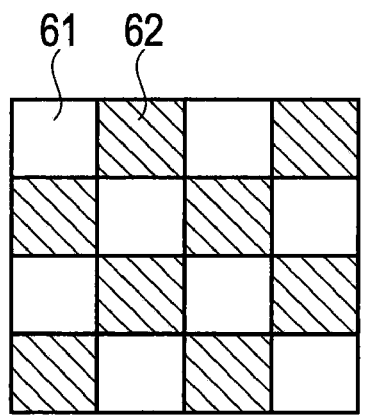
FIG. 6 is a plan view showing the placement of photosensors that still another photodetector circuit has.

Each of the photosensors shown in FIG. 5 is obtained by dividing each of the photosensors 20a, 20b, 20c, and 20d shown in FIG. 2. When the number of photosensors is increased, four photosensors in total, of which two are unshielded photosensors to determine the outside-light illuminance and two other are shielded photosensors, can be increased as a set. When the number of photosensors is actually increased, the unshielded photosensors and the shielded photosensors are placed alternating both in the lateral and the longitudinal directions. Accordingly, the influence that results from the differences in the characteristics of elements between the lines, or rows, can be reduced while the influence of the difference in thermoelectric current resulting from the uneven temperature distribution can also be reduced. When the number of photosensors is increased, it is preferable that unshielded photosensor 61 to determine the outside-light illuminance and shielded photosensors 62 are placed in a checkerboard pattern as shown in FIG. 6.

As has been described thus far, according to this embodiment, the unshielded photosensors 20a and 20d to determine the outside-light illuminance as well as the shielded photosensors 20b and 20c are placed alternating both in the lateral direction and in the longitudinal direction in the drawings. Accordingly, even when the thermoelectric currents differ from each other due to a variation in characteristics between the elements and a difference in the thermal distribution between the elements, the sensor currents can be corrected, so that a photodetector circuit which stably determines the outside-light illuminance can be provided.

What is claimed is:
1. A display device comprising:
a display area;
a surrounding area that surrounds the display area; and
a photodetector disposed in the surrounding area, the photodetector comprising:
 a first photosensor and a second photosensor configured to receive outside light, the first and second photosensors being connected in parallel to each other;
 a third photosensor and a fourth photosensor provided with respective light shields configured to block the outside light, the third and fourth photosensors being connected in parallel to each other; and
 a differential circuit configured to obtain the difference between the sum of the outputs of the first and the second photosensors and the sum of the outputs of the third and the fourth photosensors, wherein first thermoelectric currents and photoelectric currents flow through the first photosensor and the second photosensor, only second thermoelectric currents flow through the third photosensor and the fourth photosensor, and the differential circuit cancels the first and second thermoelectric currents;
  wherein the third photosensor is placed side by side with the first photosensor in the lateral direction, the fourth photosensor is placed side by side with the first photosensor in the longitudinal direction, and the second photosensor is placed side by side with the third photosensor in the longitudinal direction and with the fourth photosensor in the lateral direction.
2. The display device according to claim 1, wherein
the first and second photosensors and the third and fourth photosensors are placed alternating both in the longitudinal and the lateral directions so as to form a checkerboard pattern.

* * * * *